US009440649B2

(12) United States Patent
Ciotlos et al.

(10) Patent No.: US 9,440,649 B2
(45) Date of Patent: Sep. 13, 2016

(54) IMPACT MITIGATION BY INTELLIGENT VEHICLE POSITIONING

(71) Applicant: Robert Bosch GmbH, Stuttgart (DE)

(72) Inventors: Iulian Ciotlos, Troy, MI (US); Shuvo Bhattacharjee, Tecumseh (CA); Anson Abraham, Commerce, MI (US); Robert Jones, Canton, MI (US); Thomas Voorheis, Wayne, MI (US); Kevin Lill, Farmington Hills, MI (US); Xavier Zhu, Northville, MI (US); Michel Sittner, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/527,158

(22) Filed: Oct. 29, 2014

(65) Prior Publication Data

US 2016/0121884 A1    May 5, 2016

(51) Int. Cl.
*B60W 30/09* (2012.01)
*B60W 30/085* (2012.01)
*B60W 30/095* (2012.01)
*B60R 21/0134* (2006.01)

(52) U.S. Cl.
CPC .......... *B60W 30/09* (2013.01); *B60R 21/0134* (2013.01); *B60W 30/085* (2013.01); *B60W 30/095* (2013.01)

(58) Field of Classification Search
CPC ............... B60W 30/09; B60W 50/10; B60W 30/0953; B60W 30/085; B60W 30/0956; B60W 2420/52; B60W 2520/105; B60W 30/095; B60L 15/20; B62D 15/0265; B62M 11/06; B62K 11/06; G01S 17/93; G01S 17/023; B60Q 1/0023; G08G 1/16; G08G 1/163; G08G 1/164; B60R 21/0134
See application file for complete search history.

(56) References Cited

U.S. PATENT DOCUMENTS

| | | | |
|---|---|---|---|
| 6,037,860 A | 3/2000 | Zander et al. | |
| 7,647,178 B2 * | 1/2010 | Ekmark | G08G 1/161 340/436 |
| 8,466,807 B2 | 6/2013 | Mudalige | |

(Continued)

FOREIGN PATENT DOCUMENTS

| | | |
|---|---|---|
| DE | 102008005310 | 7/2009 |
| DE | 102011115875 | 4/2013 |

(Continued)

OTHER PUBLICATIONS

Gandhi et al., "Pedestrian Collision Avoidance Systems: A Survey of Computer Vision Based Recent Studies," Sep. 17, 2006, 6 pages.

(Continued)

*Primary Examiner* — Behrang Badii
(74) *Attorney, Agent, or Firm* — Michael Best & Friedrich LLP (57) ABSTRACT

A method and system for mitigating the impact of a vehicle collision senses location, speed, orientation, and direction of movement data of a host vehicle and an interfering vehicle that has moved or is moving into the path of the host vehicle. A control unit analyzes the data and determines whether a collision is unavoidable. If so, the control unit determines a vehicle path for the host vehicle that will minimize the effects of the collision. By changing the vehicle path, the impact of the collision is less direct and the effect on both of the vehicles is mitigated to some degree.

12 Claims, 5 Drawing Sheets

(56) References Cited

U.S. PATENT DOCUMENTS

| | | | |
|---|---|---|---|
| 8,577,550 B2 | 11/2013 | Lu et al. | |
| 2007/0112514 A1* | 5/2007 | Ekmark | G08G 1/161 |
| | | | 701/301 |
| 2007/0276600 A1 | 11/2007 | King et al. | |
| 2008/0306666 A1* | 12/2008 | Zeng | B60Q 9/006 |
| | | | 701/70 |
| 2009/0192683 A1* | 7/2009 | Kondou | B60W 10/18 |
| | | | 701/53 |
| 2012/0130629 A1* | 5/2012 | Kim | B60W 30/085 |
| | | | 701/301 |
| 2013/0261869 A1 | 10/2013 | Brenneis et al. | |
| 2013/0282268 A1 | 10/2013 | Goerick et al. | |
| 2014/0019034 A1* | 1/2014 | Bushnell | G01C 23/005 |
| | | | 701/122 |
| 2014/0032049 A1 | 1/2014 | Moshchuk et al. | |
| 2014/0336858 A1* | 11/2014 | Matsushima | B62M 11/06 |
| | | | 701/22 |
| 2014/0350836 A1* | 11/2014 | Stettner | G01S 17/023 |
| | | | 701/301 |
| 2015/0170519 A1* | 6/2015 | Langgood | G08G 1/163 |
| | | | 701/117 |
| 2015/0175159 A1* | 6/2015 | Gussner | B62D 15/0265 |
| | | | 701/1 |

FOREIGN PATENT DOCUMENTS

| | | |
|---|---|---|
| EP | 2724910 | 4/2014 |
| WO | 2005/001792 | 1/2005 |
| WO | 2010/040376 | 4/2010 |

OTHER PUBLICATIONS

International Search Report and Written Opinion for Application No. PCT/US2015/057467 dated Feb. 9, 2016 (14 pages).

* cited by examiner

IMPACT MITIGATION BY INTELLIGENT VEHICLE POSITIONING

BACKGROUND

The present invention relates to a method and system for reducing direct impact collisions of a host vehicle and a side door compartment of a vehicle entering a path of the host vehicle.

Vehicle anti-collision systems are known that provide a warning of an impending collision and/or automatically operate a brake system to avoid a collision.

SUMMARY

In one embodiment, the invention provides a method of mitigating a vehicle collision comprising: sensing location, speed and direction of movement of an interfering vehicle entering a travel path of a host vehicle, determining whether a collision between the host vehicle and the interfering vehicle is imminent and unavoidable, and when a collision between the host vehicle and the interfering vehicle is imminent and unavoidable, altering a travel path of the host vehicle to mitigate a collision with the interfering vehicle.

In one embodiment, determining collision zones comprises determining a side door compartment zone for the interfering vehicle, a rear tire zone, and a front tire zone. In another embodiment, the step of altering a travel path of the host vehicle to mitigate a collision with an interfering vehicle comprises altering the travel path of the host vehicle to impact one of the collision zones of the interfering vehicle that mitigates the collision by avoiding the side door compartment zone.

One embodiment includes obtaining location, speed and direction of movement data for the host vehicle, and the step of altering a travel path of the host vehicle to mitigate a collision comprises comparing the location, speed and direction of movement of the interfering vehicle and the location, speed and direction of movement data for the host vehicle to determine the altering of the travel path of the host vehicle. One embodiment includes predicting a future location and orientation of the host vehicle and the interfering vehicle for a collision therebetween to determine the altering of the travel path. Thus, the future location and orientation of the interfering vehicle is relative to a future location and orientation of the host vehicle at impact.

In some embodiments, altering the travel path of the host vehicle comprises at least one of the group of providing an active steering input to change a driving direction of the host vehicle and controlling a braking system of the host vehicle to perform differential braking In another embodiment, the invention provides a vehicle collision mitigation system for a host vehicle to mitigate impact to a crossing vehicle during a collision comprising: at least one vehicle sensor disposed at a front of the host vehicle for detecting data that includes speed, direction and location of objects entering a travel path of the host vehicle; a control unit including a non-volatile memory disposed on the host vehicle, the control unit being configured to: receive data from the at least one vehicle sensor of an interfering vehicle sensed entering the travel path of the host vehicle, the data including location, speed and direction of movement of the interfering vehicle; determine entry of an interfering vehicle into the travel path of the host vehicle; determine collision zones for the interfering vehicle, including a rear tire zone and a side door compartment zone; receive location, speed and direction data for the host vehicle; determine whether a collision between the host vehicle and the interfering vehicle is imminent and unavoidable; and when a collision between the host vehicle and the interfering vehicle is imminent and unavoidable, in response to the above determinations and received data, alter a travel path of the host vehicle to contact one of the collision zones of the interfering vehicle away from the side door compartment zone to mitigate the collision.

In one embodiment, the vehicle controller is configured to account for vehicle directional corrections to mitigate risk of vehicle entering adjacent lanes of travel and oncoming vehicles.

In one embodiment, the vehicle sensor comprises a video camera and at least one of a radar unit and a lidar unit. Further, the control unit is configured to identify the zones of the interfering vehicle from video data received from the video camera and to adjust which of the zones of the interfering vehicle is impacted by controlling a braking system of the host vehicle to perform differential braking that provides a resulting moment on the host vehicle to affect yaw rate and lateral position, thereby providing a limited steering function.

In one embodiment, the collision mitigation system is triggered by the interfering vehicle entering the travel path of the host vehicle while the host vehicle is moving along the travel path in a forward direction.

In another embodiment, the invention provides a method of mitigating a vehicle collision by a host vehicle with an interfering vehicle comprising: sensing location, speed and direction of movement of an interfering vehicle entering a forward travel path of the host vehicle; determining collision zones for the interfering vehicle; obtaining location, speed and direction data for the host vehicle; determining whether a collision between the host vehicle and the interfering vehicle is imminent and unavoidable by predicting future locations and orientations of the host vehicle and the interfering vehicle; and when a collision between the host vehicle and the interfering vehicle is imminent and unavoidable, altering a travel path of the host vehicle so that the host vehicle collides with one of the collision zones of the interfering vehicle that mitigates the collision.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
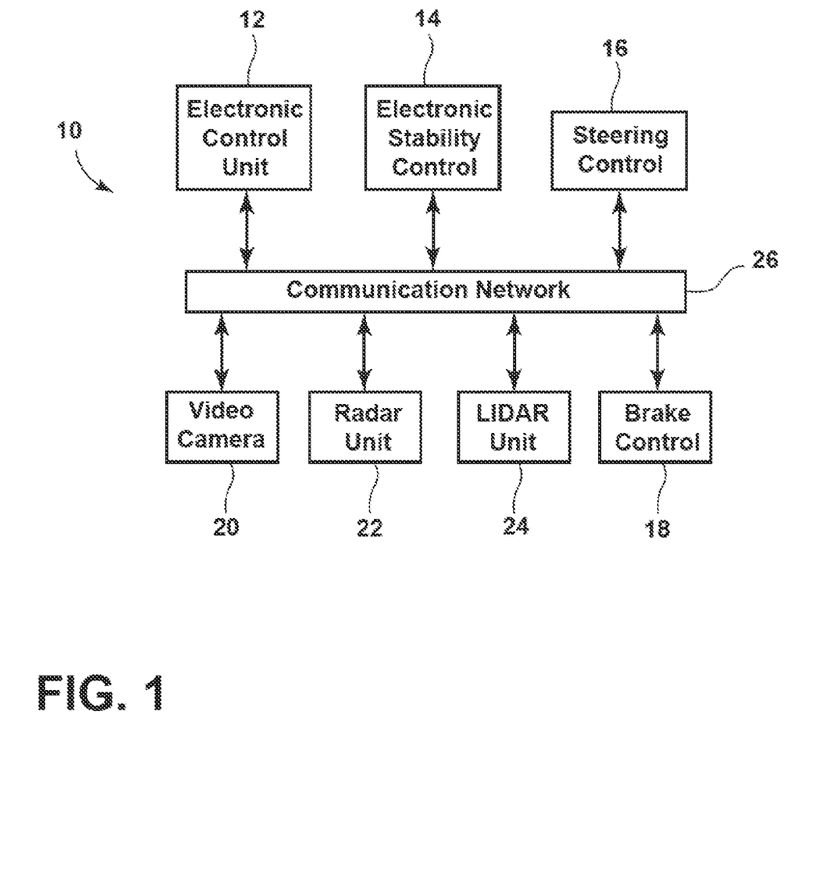
FIG. 1 shows a block diagram of a vehicle collision mitigation system.

FIG. 1 shows a vehicle collision mitigation system 10 for a host vehicle to mitigate impact to a crossing vehicle during a collision. The mitigation system 10 includes an electronic control unit (ECU) 12, an electronic stability control (ESC) 14, a steering control 16 and a brake control 18. In one embodiment, the vehicle collision mitigation system 10 also includes a video camera 20, a radar unit 22 and a lidar unit 24 that provide data. In some embodiments, a single one of a video camera 20, radar unit 22 and lidar unit 24 is provided. A communication network 26, provides communication between the various devices, including the controls, the units and the video camera. While the devices shown in FIG. 1 are components of the vehicle collision mitigation system 10, they perform other tasks or similar tasks for other vehicle systems. Various other vehicle subsystems also connect to the communication network 26 and communicate with each other.

In some constructions, the ECU 12 includes a processor that has an executable program stored in a memory module, such as a read only memory (ROM). The ECU 12 also includes a random access memory (RAM) for storing information from other vehicle units that is received through the communication network 26. Non-transitory computer readable memory modules of the ECU 12 include volatile memory, non-volatile memory, or a combination thereof and, in various constructions, may also store operating system software, applications/instructions data, and combinations thereof. The ECU 12 is provided on a host vehicle 30 and performs sensing of the presence of an interfering vehicle 32 as shown at the intersection 34 shown in FIG. 2 and provides outputs as discussed below.

The ESC 14 operates to provide outputs that control driving of the host vehicle 30. Further, the steering control 16 enables limited overriding of the user controls to steer the vehicle in certain situations. A brake control 18 is provided to enable automatic control of the hydraulic brake system or other brake systems in certain situations.

Figure 2:
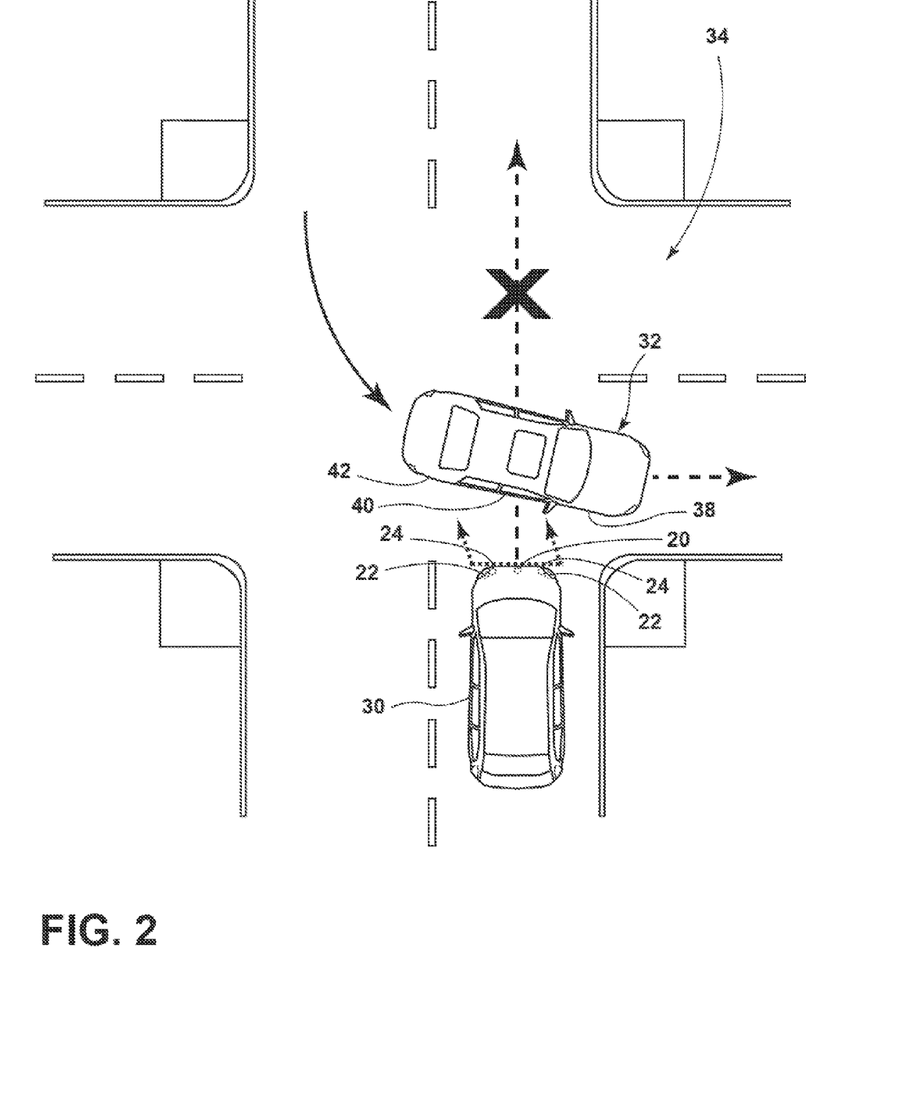
FIG. 2 shows an overhead view of a first situational example of a host vehicle equipped with the vehicle collision mitigation system approaching an interfering vehicle at an intersection.

The video camera 20 is mounted to a front of a host vehicle 30 as shown in FIG. 2. The video camera 20 acts to sense the presence of objects, such as the interfering vehicle 32 shown in FIG. 2, including the orientation and surfaces or zones provided thereon. While a single video camera 20 is illustrated in FIG. 2, spaced pairs of video cameras disposed at a front side of the host vehicle 30 are contemplated. Likewise, the radar unit 22 senses the presence and the distance of the interfering vehicle 32 from the host vehicle 30. In some embodiments, instead of a single unit, the radar unit 22 comprises a pair of spaced frontward oriented radar units as shown in FIG. 2.

In another embodiment, a pair of Light Detecting And Ranging (LIDAR) units 24 are provided at or adjacent the front of the host vehicle 30. As with the radar units 22, the lidar units 24 are intended to determine the presence, shape and distance of objects in front of the host vehicle 30. The fields of view of the lidar units 24, the radar units 22, and the video camera 20 are oriented frontward of the host vehicle 30. While the three types of vehicle sensors 20, 22, 24 are shown in FIG. 1, a single type of sensor or two types of sensors are typical for the vehicle collision mitigation system 10.

Operation

In operation, one or more of the types of sensors 20, 22, 24 (hereinafter the "sensor") detect an interfering vehicle 32 entering an intersection 34 immediately in front of the host vehicle 30 that is moving in a forward direction. The term "sensor" includes a plurality of types of sensors and a plurality of different numbers of each type of sensor. In entering the intersection 34, the interfering vehicle 32 either makes a left turn as shown by an arrow in FIG. 2 or follows a straight path along the road transverse to the travel path of the host vehicle 30.

Besides, detecting the location of the interfering vehicle 32, the sensor detects the speed and direction of movement data of the interfering vehicle. The location, speed and direction data are provided to the ECU 12 via the communication network 26. At the same time, the location, speed and direction of movement data of the host vehicle is provided from the ESC 14 via the communication network to the ECU 12.

The ECU 12 analyzes the location, speed and direction of movement data from both the host vehicle 30 and the interfering vehicle 32 to determine whether a collision is imminent and unavoidable. If so, the ECU 12 determines zones on the side of the interfering vehicle 32. Typically, with the video camera 20 and analysis of images thereon, including the vehicle tires of the interfering vehicle 32, the ECU 12 determines a front tire zone 38, a side door compartment zone 40 and a rear tire zone 42. Thus, the ECU 12 processes video data of a broad side of the interfering vehicle to classify features of the vehicle to determine the presence and locations of at least the front tire zone 38, the side door compartment zone 40, and the rear tire zone 42.

In a collision avoidance system without a mitigation system, the host vehicle 30 collides with the side door compartment zone 40 of the interfering vehicle 32, which has a T-bone effect and is more likely to collapse a side wall of the interfering vehicle and injuring passengers or vehicle operator.

Figure 3:
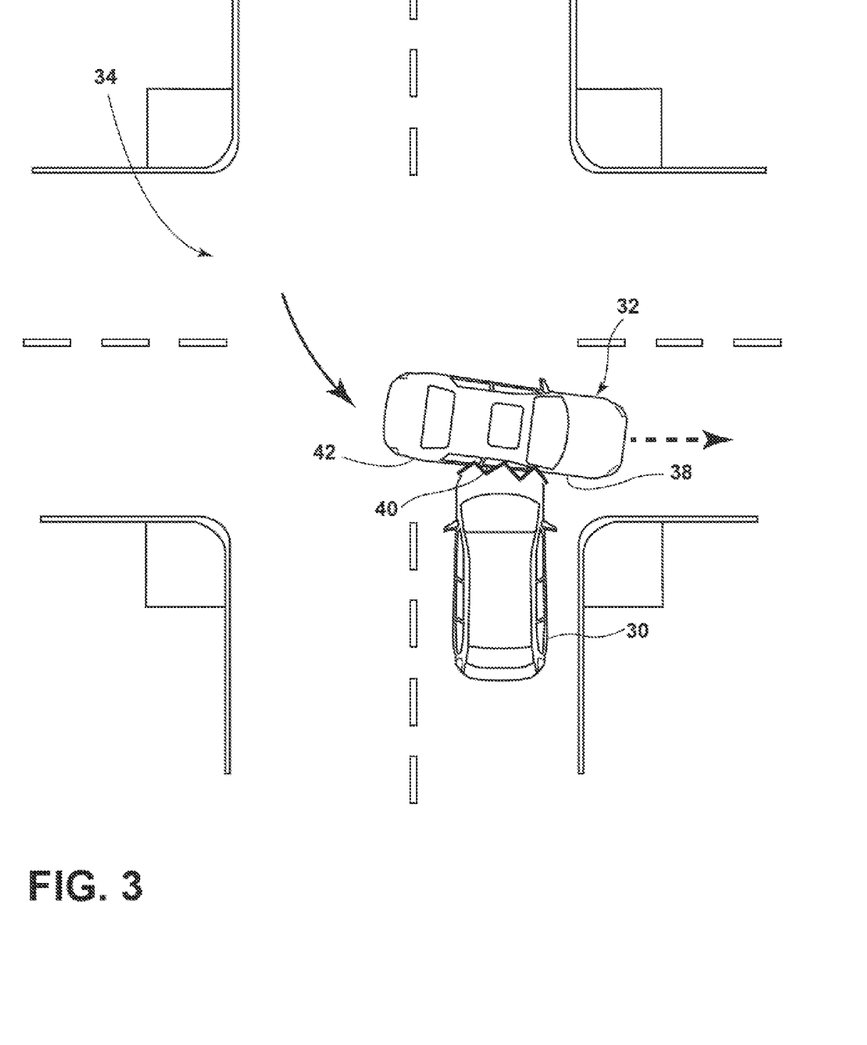
FIG. 3 shows an overhead view of a vehicle collision without a vehicle collision mitigation system.

The vehicle collision mitigation system 10, in response to the analysis indicating an impending collision, determines from the location, speed and direction of movement data of both vehicles 30, 32, a path to mitigate the severity of the impending collision. The vehicle collision mitigation system also determines a potentially less severe zone on the interfering vehicle. As shown in FIG. 3, the host vehicle is controlled to turn in a leftward direction. In one embodiment, the steering control 16 receives an input from the ECU 12 to cause a leftward or rightward turning independent of the vehicle operator. In another embodiment, the ECU 12 provides an input to the brake control 18 causing the brake control to perform differential braking, whereby the host vehicle 30 is turned leftwardly or rightwardly. In either instance, the host vehicle 30 impacts the interfering vehicle 32 at a potentially less severe collision zone, for example, the rear tire zone 42.

Figure 4:
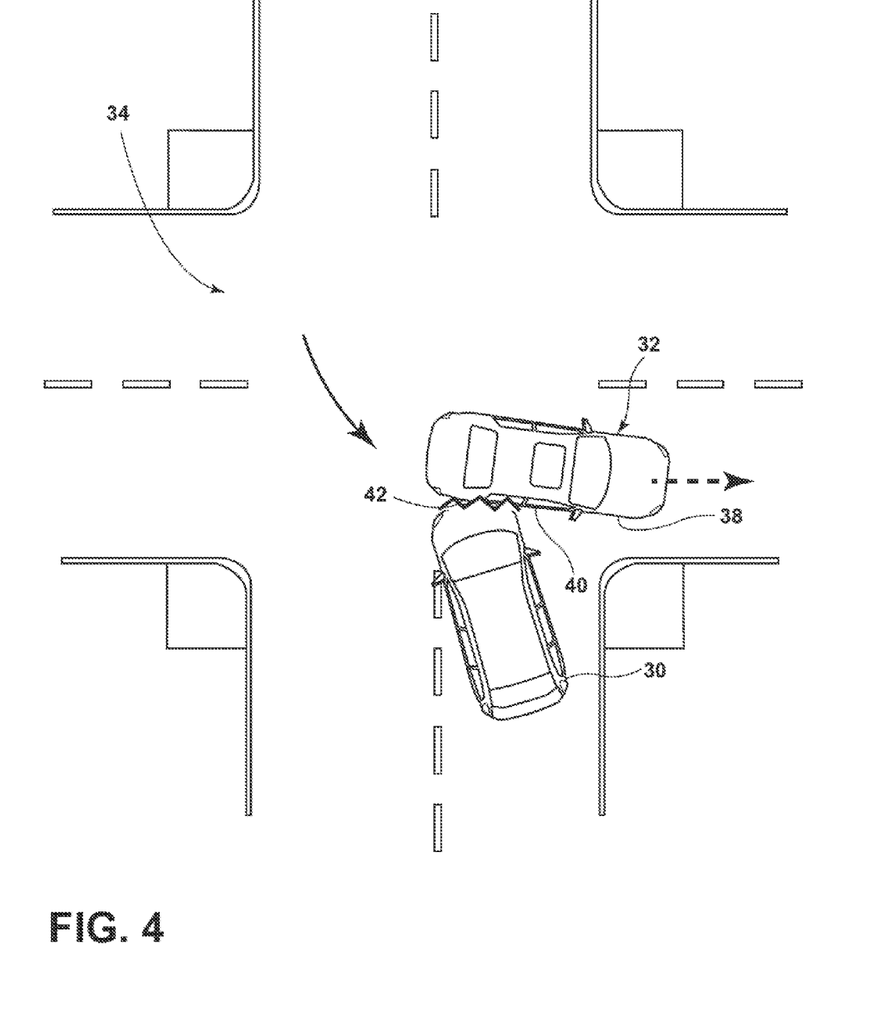
FIG. 4 shows an overhead view of a vehicle collision with a vehicle collision mitigation system.
Figure 5:
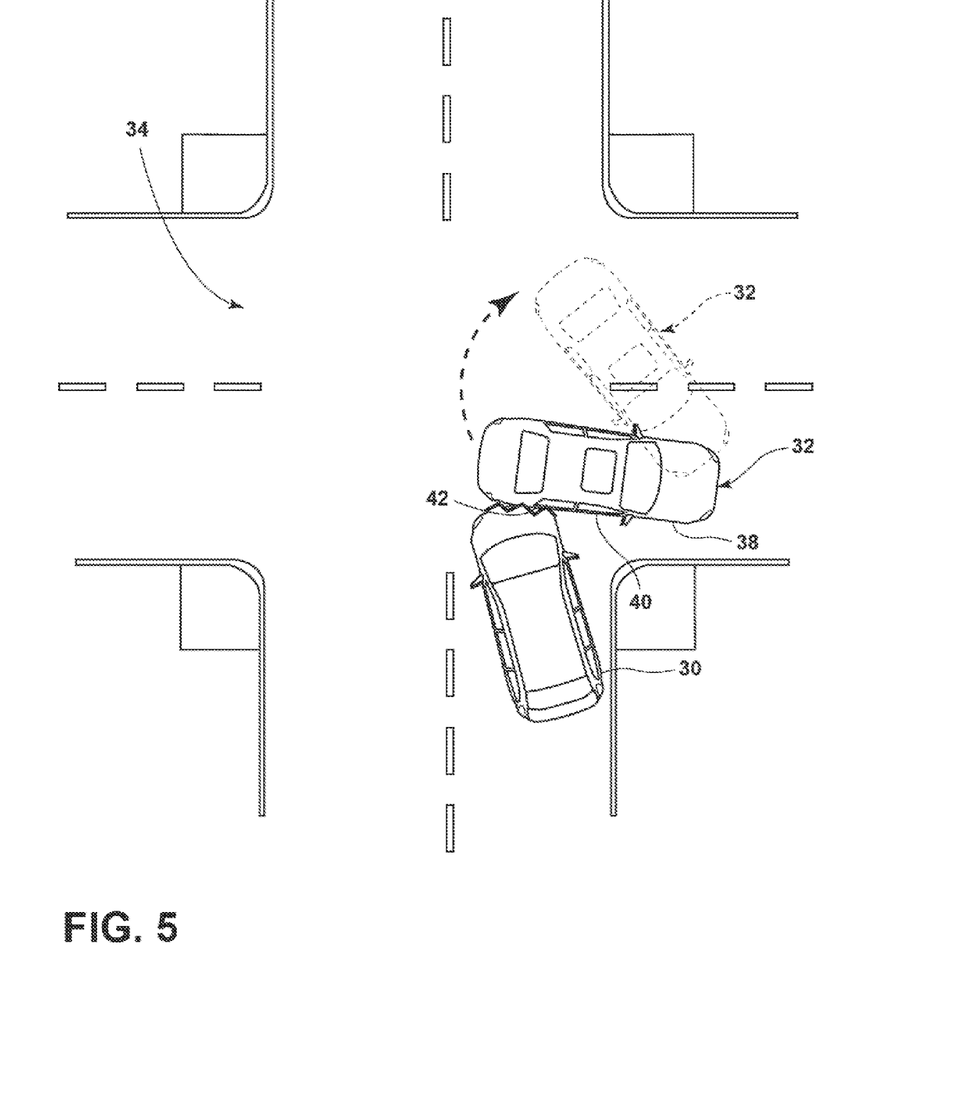
FIG. 5 shows an overhead view of a result of a vehicle collision for an interfering vehicle.

By impacting a potentially less severe collision zone, such as the rear tire zone 42 of the interfering vehicle 32, the front of the host vehicle 30 does not collapse the sidewall of the vehicle 32. Thus, a passenger or vehicle operator avoids the possibility of direct contact with the host vehicle 30. Further, by contacting the rear tire zone 42 as shown in FIG. 4, the host vehicle applies a force that causes the interfering vehicle 32 to rotate or spin in a manner illustrated in FIG. 5. By rotating, some of the energy of the collision is not absorbed by the interfering vehicle 32. For example, friction of the moving tires and shifting of the weight of the interfering vehicle 32 lessens the amount of force absorbed by the side wall of the vehicle 32 near the rear tire zone 42. Accordingly, the result of the collision typically is less severe.

Further, by impacting the rear tire zone 42 and rotating the interfering vehicle 32, the possibility of vehicle rollover is minimized.

In many embodiments, the vehicle collision mitigation system 10 is an added on feature to an anti-collision system. Thus, the same sensors and controls are utilized, but a different result is obtained.

In some embodiments, some or all of the method performed by the ECU 12 is performed by the ESC 14.

Thus, the invention provides, among other things, a method and system for mitigating the severity of vehicle collisions. Various features and advantages of the invention are set forth in the following claims.

What is claimed is:

1. A method of mitigating a vehicle collision comprising:
    sensing location, speed and direction of movement of an interfering vehicle entering a travel path of a host vehicle;
    determining collision zones for the interfering vehicle including determining at least a side door compartment zone for the interfering vehicle;
    determining whether a collision between the host vehicle and the interfering vehicle is imminent and unavoidable; and
    when a collision between the host vehicle and the interfering vehicle is imminent and unavoidable, altering the travel path of the host vehicle to impact the interfering vehicle at one of the collision zones that is a potentially less severe collision zone.

2. The method of mitigating a vehicle collision according to claim 1, wherein determining the collision zones comprises determining at least a side door compartment zone for the interfering vehicle, and
    wherein the step of altering a travel path of the host vehicle to mitigate a collision with the interfering vehicle comprises altering the travel path to avoid a collision with the side door compartment zone for the interfering vehicle and to impact the potentially less severe collision zone for the interfering vehicle.

3. The method of mitigating a vehicle collision according to claim 2, wherein determining the collision zones comprises determining a front tire zone and a rear tire zone, and
    wherein the step of altering a travel path of the host vehicle to mitigate a collision with the interfering vehicle comprises altering the travel path to collide with one of the front tire zone and the rear tire zone, which are each the potentially less severe collision zone, to mitigate a collision by avoiding a collision with the side door compartment zone of the interfering vehicle that is more likely to collapse a side wall of the interfering vehicle and injure a passenger or vehicle operator.

4. The method of mitigating a vehicle collision according to claim 2, including:
    obtaining location, speed and direction of movement data for the host vehicle,
    wherein the step of altering a travel path of the host vehicle to mitigate a collision with the interfering vehicle comprises comparing the location, speed and direction of movement of the interfering vehicle and the location, speed and direction of movement data for the host vehicle to determine the altering of the travel path of the host vehicle.

5. The method of mitigating a vehicle collision according to claim 2, wherein the step of altering a travel path of the host vehicle to mitigate a collision with the interfering vehicle includes predicting a future location and orientation of the host vehicle and the interfering vehicle at a collision therebetween to determine the altering of the travel path.

6. The method of mitigating a vehicle collision according to claim 1, wherein the step of altering a travel path of the host vehicle comprises at least one from the group of providing an active steering input to change a driving direction of the host vehicle and controlling a braking system of the host vehicle to perform differential braking.

7. The method of mitigating a vehicle collision according to claim 1, further comprising:
    obtaining location, speed and direction data for the host vehicle;
    the step of determining whether a collision between the host vehicle and the interfering vehicle is imminent and unavoidable including predicting future locations and orientations of the host vehicle and the interfering vehicle; and
    the step of altering a travel path of the host vehicle to mitigate a collision including altering the travel path to collide with the one of the collision zones of the interfering vehicle that is a potentially less severe collision zone.

8. The method according to claim 7, wherein the step of determining the collision zones for the interfering vehicle comprises determining at least a rear tire zone, a front tire zone, and a side door compartment zone, and wherein the step of altering a travel path comprises altering the travel path so that the host vehicle avoids or minimizes a collision with the side door compartment zone of the interfering vehicle and collides with one of the rear tire zone and the front tire zone that are potentially less severe collision zones.

9. The method according to claim 8, wherein the step of determining the collision zones for the interfering vehicle including sensing a broad side of the interfering vehicle with a video camera, and processing video data to classify features of the interfering vehicle to determine the presence and locations of at least the rear tire zone, the front tire zone, and the side door compartment zone.

10. A method of mitigating a vehicle collision comprising:
    sensing location, speed and direction of movement of an interfering vehicle entering a travel path of a host vehicle;
    obtaining location, speed and direction data for the host vehicle;
    determining at least a rear tire zone, a front tire zone, and a side door compartment zone as collision zones for the interfering vehicle;
    determining whether a collision between the host vehicle and the interfering vehicle is imminent and unavoidable including predicting future locations and orientations of the host vehicle and the interfering vehicle; and
    when a collision between the host vehicle and the interfering vehicle is imminent and unavoidable, altering the travel path of the host vehicle to avoid or minimize a collision with the side door compartment zone of the interfering vehicle and to collide with one of the rear tire zone and the front tire zone of the interfering vehicle.

11. The method according to claim 10, wherein the step of determining collision zones for the interfering vehicle including sensing a broad side of the interfering vehicle with a video camera, and processing video data to classify features of the interfering vehicle to determine the presence and locations of at least the rear tire zone, the front tire zone, and the side door compartment zone.

12. The method of mitigating a vehicle collision according to claim 11, wherein the step of altering a travel path of the host vehicle comprises at least one from the group of providing an active steering input to change a driving direction of the host vehicle and controlling a braking system of the host vehicle to perform differential braking.

* * * * *